United States Patent

Rogers et al.

[11] 4,081,303
[45] Mar. 28, 1978

[54] PIPE LINER LAMINATE AND METHOD OF MAKING A PIPE WITH SAID LINER

[75] Inventors: Philip A. Rogers, Denison, Tex.; John F. Herr, Larkspur, Colo.

[73] Assignee: Johns-Manville Corporation, Denver, Colo.

[21] Appl. No.: 689,698

[22] Filed: May 24, 1976

Related U.S. Application Data

[62] Division of Ser. No. 347,607, Apr. 3, 1973, abandoned.

[51] Int. Cl.² .......................... B32B 1/08; B31C 13/00
[52] U.S. Cl. ..................................... 156/192; 138/129; 138/137; 138/141; 138/145; 156/195; 428/36
[58] Field of Search ............... 156/171, 172, 173, 187, 156/188, 192, 195, 294; 138/125, 137, 141, 144, 145, 129; 428/36

[56] References Cited

U.S. PATENT DOCUMENTS

| | | | |
|---|---|---|---|
| 2,783,173 | 2/1957 | Walker et al. | 138/144 |
| 3,033,238 | 5/1962 | Kosewicz | 138/141 |
| 3,205,913 | 9/1965 | Ehlers | 138/125 |
| 3,483,896 | 12/1969 | Grosh | 138/144 |
| 3,501,359 | 3/1970 | Gillespie et al. | 138/144 |
| 3,886,017 | 5/1975 | Brugh et al. | 156/192 |
| 3,939,873 | 2/1976 | Rinker et al. | 138/144 |

*Primary Examiner*—William A. Powell
*Assistant Examiner*—Thomas Bokan
*Attorney, Agent, or Firm*—Robert M. Krone; Joseph J. Kelly; Stephen C. Shear

[57] ABSTRACT

A piper liner laminate and method of making a pipe including this liner are disclosed herein. The liner comprises a central layer preferably of either polyethylene or polypropylene sandwiched between first and second layers of fibrous material, for example polyester mat, which are laminated together preferably by a mechanical bond. Constructed in this manner, the liner, which is especially suitable for sewer pipe, provides a reliable barrier preventing corrosive chemicals from penetrating therethrough and into the wall of the pipe.

3 Claims, 3 Drawing Figures

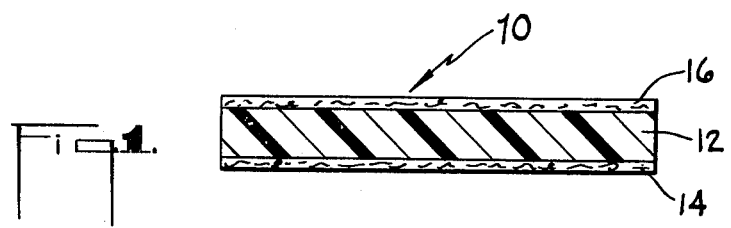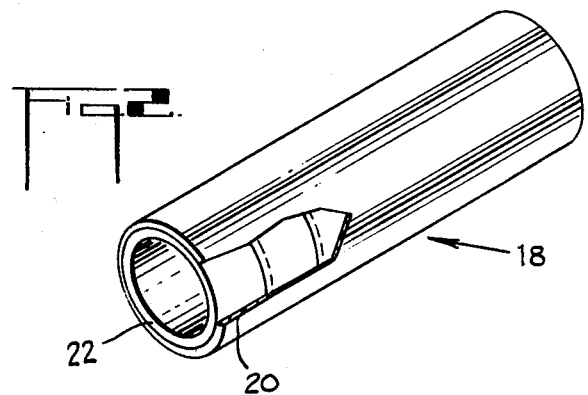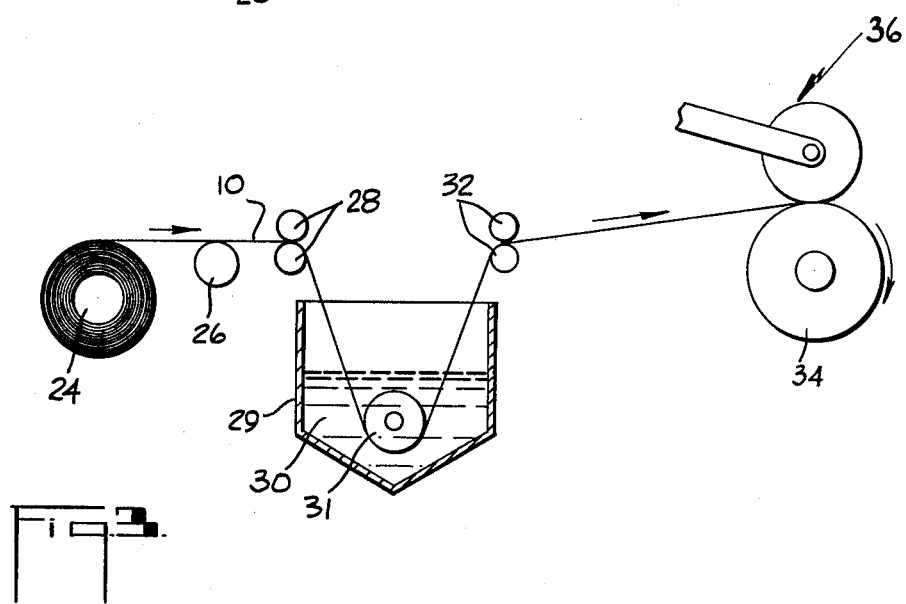

PIPE LINER LAMINATE AND METHOD OF MAKING A PIPE WITH SAID LINER

This is a division of application Ser. No. 347,607, filed Apr. 3, 1973, now abandoned.

BACKGROUND OF THE INVENTION

1. Field of the Invention

The present invention relates generally to corrosion resistant liners and more particularly to a liner laminate especially suitable for sewer pipes and storage vessels which may convey or store corrosion producing material.

2. Summary of the Prior Art

On designing sewer pipe or other such pipe which is made of material susceptible to chemical corrosion, for example fiber glass, and which is provided for carrying a chemically corrosive substance, for example chemicals in sewage, an inner protective liner or barrier is necessary. Heretofore, this barrier, or gel coat layer as it is commonly called, has been made of various ingredients and combinations of ingredients such as, for example, resin impregnated cloth wound around a mandrel. In the past, when sewer pipe of the type including reinforced glass fiber reinforcement has failed, quite often the cause of the failure was due to chemical corrosion of the glass. Hence, improvements in a protective liner are always welcome. This is especially true where the improvement provides a liner which is not only reliable, but also uncomplicated in design and economical to manufacture in combination with the pipe. As will be seen hereafter, the present invention provides such an improvement.

OBJECTS AND SUMMARY OF THE INVENTION

In accordance with the foregoing, an object of the present invention is to provide an improved corrosion resistant laminate.

Another object of the present invention is to provide a laminate of the last-mentioned type which is especially suitable for use as a liner in sewer pipe made with material highly susceptible to corrosion.

Still another object of the present invention is to provide a method of making a protective liner such that the various layers making up the same are reliably held together.

Yet another object of the present invention is to provide a method of forming said laminate into a liner comprising part of pipe.

The foregoing objects and other objects and features of the present invention are achieved by the utilization of a flexible laminate including a central layer of solid thermoplastic film, preferably either polyethylene or polypropylene, sandwiched between two layers of fibrous material, for example, polyester mat. The laminate is preferably made by mechanically bonding, i.e. melting, the central layer between the fibrous material such that the central layer penetrates into the fiber of the latter for creating a reliable bond.

This laminate is incorporated into a pipe such as, for example, a reinforced plastic mortar pipe (i.e., RPM pipe) by at least partially saturating or impregnating the fibrous layers with a liquified resinous bonding substance. Thereafter, the laminate is wound around a mandrel, completely covering a predetermined length of the latter. The body of the pipe is then formed around the laminate. In this manner, the latter becomes the innermost liner or barrier for the overall pipe construction.

BRIEF DESCRIPTION OF THE DRAWING

FIG. 1 is a cross-sectional view of a corrosion resistant and flexible laminate constructed in accordance with the present invention.

FIG. 2 is a partially broken away perspective view of a pipe including a protective liner comprising the laminate of FIG. 1.

FIG. 3 is a schematic illustration of a method of making the pipe of FIG. 2.

DETAILED DESCRIPTION AND PREFERRED EMBODIMENTS

Turning to the drawing, wherein like components are designated by like reference numerals throughout the three figures, a corrosion resistant and flexible laminate 10, constructed in accordance with the present invention, is illustrated. As will be seen hereinafter, this laminate is especially suitable as an inner protective liner in pipes or storage vessels which are constructed of material susceptible to chemical corrosion and which carry or store substances including corrosion producing chemicals. For example, sewer pipe constructed of the reinforced plastic mortar type would be susceptible to chemical corrosion since it carries chemicals, i.e., in the sewage, which could produce corrosion. Laminate 10 provides a reliable liner or barrier against this latter possibility.

Turning to FIG. 1, laminate 10 is shown in cross-section and exaggerated in thickness so as to move readily display its various layers. One such layer is central layer 12 which, in accordance with the present invention, comprises a solid thermoplastic film, preferably either a solid film of polyethylene or a solid film of polypropylene. In generic terms, this central layer, if polyethylene or polypropylene, could be referred to as a solid polyolefin homopolymer polymerized from an olefin monomer having two to three carbon atoms. Both polyethylene and polypropylene have been found to be highly resistant to acids and other such corrosion chemicals typically found in sewage and therefore provide excellent barriers preventing penetration of these chemicals. In addition, both polyethylene and polypropylene film, if not too thick, are sufficiently flexible to be readily manufactured into a pipe liner in a manner to be described hereinafter. In this regard, central layer 12 is preferably no thicker than approximately 15 mils so as to provide this flexibility and is preferably no thiner than approximately 5 mils. Below approximately 5 mils, the central layer, in some cases, might be too thin to provide a satisfactory barrier.

In addition to central layer 12, the laminate includes an inner layer 14 and an outer layer 16 which are bonded to opposite sides of the central layer, preferably in a manner to be described below. These layers 14 and 16 comprise a fibrous material sufficiently thick to absorb liquified resinous bonding substance. This is because both polyethylene and polypropylene, in solid form, are very difficult to bond with other materials and particularly typical materials utilized in reinforced plastic mortar pipe. Hence, the layers 14 and 16 of fibrous material act as coupling or bonding layers when laminate 10 is utilized as a liner or barrier in the construction of RPM pipe. This will be discussed in more detail hereinafter.

Any suitable fibrous material can be provided for layers 14 and 16 so long as they will readily bond to the central layer of thermoplastic 12 and as long as they will hold at least some liquified bonding resin. In this regard, these layers would of course be in mat form and must be sufficiently thick to absorb some of the bonding resin. In accordance with a working embodiment of the present invention, each of the fibrous layers 14 and 16 are constructed of a polyester mat, either spunbonded or otherwise, which is preferably approximately 10 mils thick. Polyester is especially suitable because it is to a large degree resistant to acids and other chemicals found in sewer pipe and because it is economically and readily available. An available spunbonded mat is manufactured by DuPont under the name Reemay and one which is not spunbonded is available and manufactured by Chicopee, Inc.

The layers 12, 14 and 16 making up laminate 10 are preferably mechanically bonded together. More specifically, in accordance with a preferred method, the polyethylene, polypropylene or other such thermoplastic resin is melted between the two layers of fibrous material and the three components are squeezed together so that the resin is actually impregnated or imbedded into both outer layers of fiber. Hence, when the melted resin has cooled, the resultant laminate is an integral structure reliably held together mechanically. The resin must not completely penetrate through the fibrous layers so that the latter can hold bonding resin.

Turning to FIG. 2, an RPM pipe 18, constructed in accordance with the present invention, is illustrated. This pipe includes a body portion 20 comprising most of the pipe and constructed of a plurality of layers (not shown) which typically make up such a pipe. Because these layers may be conventional and well known in the art, they will not be described and/or illustrated herein. However, typical RPM pipe is described in U.S. Pat. No. 3,483,896 and reference is made thereto. One point which should be noted is that these types of pipe typically include reinforcement layers of glass. As stated hereinabove, glass is highly susceptible to corrosion by acids and other such chemicals commonly found in sewage or sewer pipes generally. If such corrosion should occur, the possibility of failure in the pipe is quite high. Hence, it is very important to provide the pipe with a liner or barrier, commonly referred to as a gel coat, as stated above.

In accordance with the present invention, pipe 18 includes a liner 22 made from a longitudinal strip of laminate 10. This strip, as will be seen below with respect to FIG. 3, is wound around a mandrel such that it defines a helical path and such that adjacent longitudinal edges of the strip overlap one another. This overlapping relationship is indicated in FIG. 2. As will also be seen, bonding resin is provided for bonding liner 22 with body portion 20 of pipe 18 and also for bonding together the overlapping surfaces of the laminate strip.

Having described the construction of corrosion resistant and flexible laminate 10 and pipe 18 utilizing a liner constructed from this laminate, attention is now directed to the method of making the pipe. In this regard, laminate 10 is in continuous strip form which, in accordance with the working embodiment in the present invention, is approximately 7 inches wide. The strip is supplied in roll form on a spindle or other such means 24, as indicated in FIG. 3. From the spindle, the strip is carried over tension rollers 26 and 28 and into a bath or tub 29 of bonding resin 30 under a roller 31, where the fibrous layers 14 and 16 are impregnated with the resin. This resin can be of any suitable type and is preferably a polyester resin. More specifically, in accordance with a working embodiment of the present invention, this resin is a isophthalic polyester resin (for example, one manufactured by Alpha Chemical Corp. under the name ALTEK) filled with aluminum silicate. In addition, a standard flexibilizer, is provided. This flexibilizer provides elongation properties to the resin.

From the resin bath, the strip passes through an arrangement of adjustable squeeze rollers 32 where excess resin is removed. From there, the strip is initially manually wrapped or otherwise suitably secured around a mandrel 34 at one axial end of the latter. While not shown, the mandrel includes means for imparting both rotation and axial movement thereto. More specifically, during operation and after the strip has been initially secured to the mandrel, the latter both rotates, as indicated by the arrow, and moves axially. These two movements are coordinated such that the strip wraps around the mandrel so that it defines a helical path and so that its longitudinal edges overlap. In this manner, a predetermined length of the mandrel is completely covered. As an example of a working embodiment, the strip of laminate is 7 inches wide and the mandrel moves 6 inches forward for every rotation. Hence, a 1 inch overlap is provided for each mandrel rotation. This 1 inch overlap provides a bond between adjacent windings with resin disposed therebetween, thereby preventing leakage therethrough. During this procedure, a conventional press roller arrangement 36 is preferably provided against the laminated strip as the latter is wound around the mandrel. This eliminates the formation of air bubbles under the ultimately formed liner.

After formation of liner 22, body 20 of pipe 18 is formed. This may be conventionally accomplished and, hence, will not be discussed herein. In addition, body 20 may be constructed of any suitable material. For example, in RPM pipe, the body of the pipe would comprise individual resin impregnated layers of continuous high strength filamentary material (i.e., a mat of continuous glass rovings) and longitudinally reinforcing materials (i.e., glass woven rovings) along with various sand layers.

What is claimed is:

1. A method of making a pipe having a body portion and an inner protective liner, said method comprising:
   (a) forming a corrosion resistant and flexible laminate strip which is longer than it is wide, said strip including:
      (i) a central layer of solid polyolefin homopolymer polymerized from an olefin monomer having 2 to 3 carbon atoms,
      (ii) an innermost layer of fibrous material bonded to one side of said central layer, and
      (iii) an outermost layer of fibrous material bonded to the opposite side of said central layer;
   (b) at least partially saturating said innermost and outermost layers with a resinous bonding substance in liquid state;
   (c) winding said laminate strip around a mandrel so as to completely cover a predetermined portion of said mandrel, said strip being wound so that it defines a helical path and includes overlapping longitudinal edges having said bonding substance therebetween;
   (d) forming the body portion of said pipe around said flexible laminate and in contact with said resinous substance in said outer layer of fibrous material, and (e) curing said resinous material.

2. A method according to claim 1 including forming said flexible laminate by mechanically bonding together said central layer and said innermost and outermost layers.

3. A method according to claim 2 wherein said last-mentioned forming step includes at least partially melting said central layer, embedding the latter into said layers of fibrous material and thereafter allowing the central layer to harden.

* * * * *